(12) United States Patent
Puglisi

(10) Patent No.: US 11,777,943 B2
(45) Date of Patent: Oct. 3, 2023

(54) ENTERTAINMENT INTERACTION BASED ON ACCESSING A SEPARATE SYSTEM TO POPULATE A HIDDEN FIELD

(71) Applicant: Universal City Studios LLC, Universal City, CA (US)

(72) Inventor: Nick Puglisi, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 133 days.

(21) Appl. No.: 17/200,579

(22) Filed: Mar. 12, 2021

(65) Prior Publication Data

US 2021/0344682 A1 Nov. 4, 2021

Related U.S. Application Data

(60) Provisional application No. 63/018,134, filed on Apr. 30, 2020.

(51) Int. Cl.
| | | |
|---|---|---|
| *H04L 9/40* | (2022.01) | |
| *G06F 9/54* | (2006.01) | |
| *G06F 3/0482* | (2013.01) | |
| *G06F 21/60* | (2013.01) | |
| *H04L 67/306* | (2022.01) | |

(52) U.S. Cl.
CPC .......... *H04L 63/102* (2013.01); *G06F 3/0482* (2013.01); *G06F 9/54* (2013.01); *G06F 21/602* (2013.01); *H04L 63/0884* (2013.01); *H04L 67/306* (2013.01)

(58) Field of Classification Search
CPC . H04L 63/102; H04L 63/0884; H04L 67/306; H04L 63/0428; G06F 3/0482; G06F 9/54; G06F 21/602; G06F 21/31; A63G 31/16; A63G 31/00; A63G 7/00
See application file for complete search history.

(56) References Cited

U.S. PATENT DOCUMENTS

| | | | |
|---|---|---|---|
| 8,330,587 B2 | 12/2012 | Kupstas | |
| 10,478,719 B2 | 11/2019 | Weston et al. | |
| 10,603,564 B2 | 3/2020 | Yeh et al. | |
| 10,845,975 B2 | 11/2020 | Vyas et al. | |
| 2015/0142483 A1* | 5/2015 | Bergdale | G06Q 10/02 705/5 |
| 2018/0357440 A1* | 12/2018 | Brady | H04L 63/08 |
| 2019/0270022 A1 | 9/2019 | Magpuri et al. | |
| 2020/0098190 A1 | 3/2020 | Goergen et al. | |
| 2021/0266326 A1* | 8/2021 | Chen | H04L 67/52 |

OTHER PUBLICATIONS

PCT/US2021/028652 International Search Report and Written Opinion dated Aug. 9, 2021.

* cited by examiner

*Primary Examiner* — Huan V Doan
(74) *Attorney, Agent, or Firm* — Fletcher Yoder, P.C.

(57) ABSTRACT

An interactive platform for controlling interactive features in an amusement park, wherein the interactive platform includes a control center that receives an account request from a user computer system, populates forward facing data fields based on user inputs from the user computer system, coordinates authentication of the account request with a separate system configured to utilize a login application programming interface to share authentication data, receives the authentication data from the separate system, provides access to a user account based on the authentication data, and populates hidden data fields of the control center based on user data provided by the separate system.

20 Claims, 3 Drawing Sheets

ENTERTAINMENT INTERACTION BASED ON ACCESSING A SEPARATE SYSTEM TO POPULATE A HIDDEN FIELD

CROSS-REFERENCE TO RELATED APPLICATION

This application claims priority to and the benefit of U.S. Provisional Application No. 63/018,134, entitled "ENTERTAINMENT INTERACTION BASED ON ACCESSING A SEPARATE SYSTEM TO POPULATE A HIDDEN FIELD," filed Apr. 30, 2020, which is hereby incorporated by reference in its entirety for all purposes.

BACKGROUND

The subject matter disclosed herein relates to amusement parks, and more specifically, to providing enhanced entertainment and components of interest in amusement parks.

Amusement parks and/or theme parks may include various entertainment attractions (e.g., restaurants, rides, and shows) useful in providing enjoyment to guests or patrons of the amusement park. For example, the attractions may include traditional rides for kids, such as carousels, as well as traditional rides for thrill seekers, such as rollercoasters. It is now recognized that adding components of interest and thrill factors to such attractions and other areas of an amusement park can be difficult. In particular, including features that facilitate emersion of the guest in an experience and that provoke guests to feel that they have experienced something truly magical is a challenge.

It is now recognized that patrons often have a preference for personalized experiences. Further, it is also recognized that, with increased availability of technology and information via the internet, patrons are also more educated and tech-savvy with respect to how special effects are generated and information is obtained. This can make it difficult to provide experiences that feel magical because the techniques and mechanisms behind the experience can be readily identified. Accordingly, it is now recognized that it is desirable to include components of interest in a personalized, efficient and surprising manner relative to traditional techniques.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In an embodiment, an interactive platform for controlling interactive features is provided in an amusement park. The interactive platform includes a control center that receives an account request from a user computer system, populates forward facing data fields based on user inputs from the user computer system, coordinates authentication of the account request with a separate system configured to utilize a login application programming interface to share authentication data, receives the authentication data from the separate system, provides access to a user account based on the authentication data, and populates hidden data fields of the control center based on user data provided by the separate system.

In an embodiment, a method of authentication and population of hidden data fields to facilitate control of interactive devices in an amusement park setting is provided. The method includes receiving an account request at a control center from a user computer system, populating forward facing data fields of the control center based on user inputs from the user computer system. Further, the method includes coordinating, by the control center, authentication of the account request with a separate system configured to utilize a login application programming interface to share authentication data, receiving, at the control center, the authentication data from the separate system and providing access to a user account for the user computer system based on the authentication data, and populating hidden data fields of the control center based on user data provided by the separate system.

In an embodiment, a system for populating hidden data fields and controlling interactive experiences in an amusement park based on the hidden data fields is provided. The system includes a separate system that utilizes a login application programming interface to share authentication data. The system also includes a control center operable to receive an account request from a user computer system and populate forward facing data fields based on user inputs from the user computer system, coordinate authentication of the account request with the separate system based on interfacing with the login application programming interface, receive the authentication data from the separate system and provide access to a user account based on the authentication data, and populate the hidden data fields of the control center based on user data provided by the separate system. Further, the system includes one or more interactive devices positioned in the amusement park and configured be controlled by the control center based on the user data.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
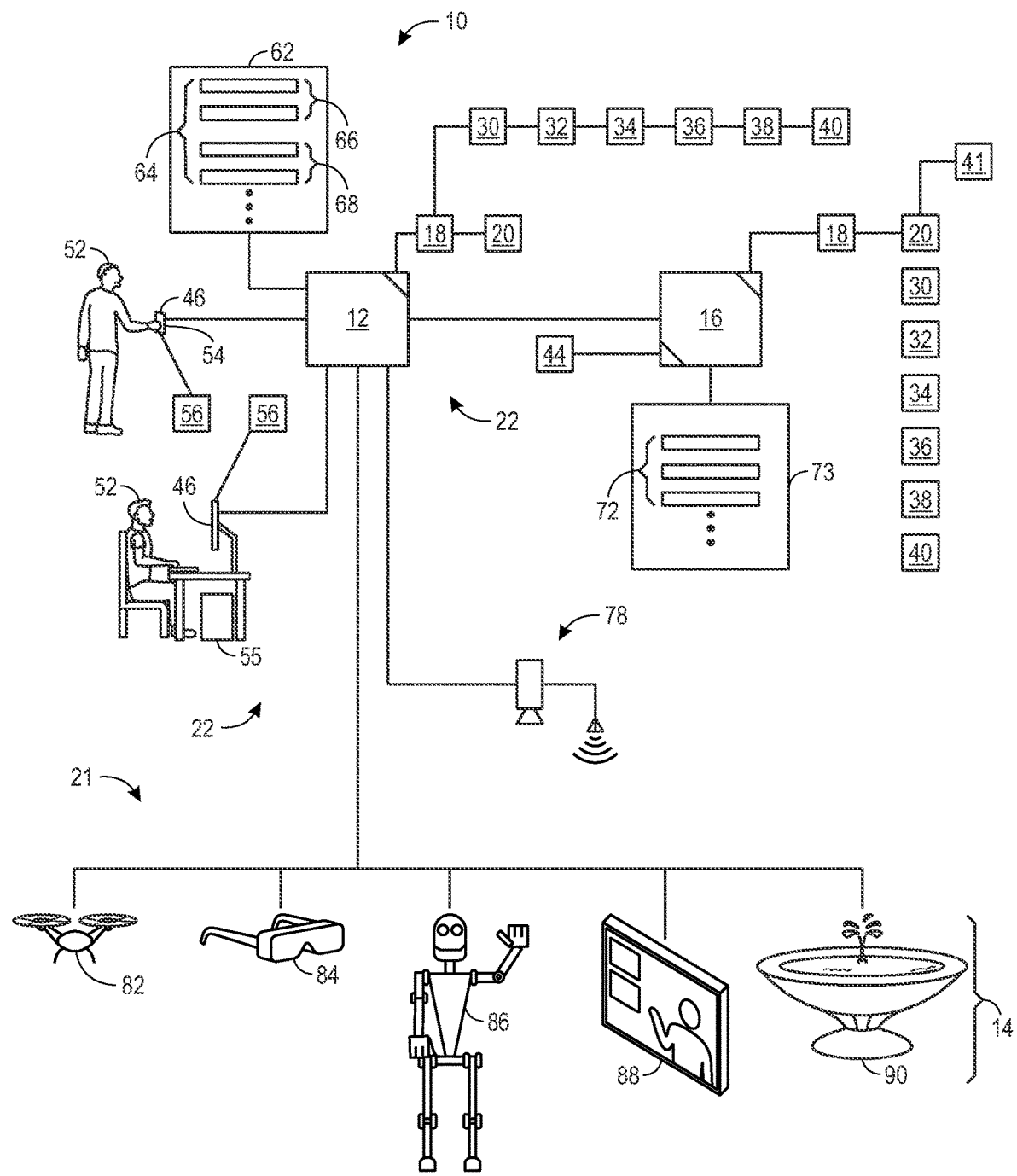
FIG. 1 is a schematic diagram of an interactive platform and separate system operable to provide authentication of an account and user interactions in an amusement park based on hidden data associated with the account, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are directed to improving guest experiences at an amusement park. An amusement park may include a ride, a mall of amusement park facilities (e.g., restaurants, souvenir shops, and shows), an assembly of amusement attractions (e.g., Ferris Wheel, dark ride, or other attraction), and so forth. In certain embodiments, a ride may include a rollercoaster, dark ride or other similar ride-based experience, and may thus further include a ride path that a passenger ride vehicle traverses during operation. It should be appreciated that while the passenger ride vehicle is in operation, present embodiments may be utilized to enhance the experience of guests on the ride vehicle. Likewise, present embodiments may be utilized to enhance guest experiences throughout the amusement park, even while the guest is simply traveling between locations within the amusement park. It should be noted that the term guest is used throughout this disclosure to reference users of disclosed systems and methods. While the term guest is frequently used, other types of users are contemplated. For example, present embodiments include systems and techniques for guest registration; and it is presently contemplated that non-guest users may employ such registration systems and techniques on behalf of a guest or future guest. Further, the term user may be interchangeable with the word guest for certain aspects of the disclosure. Accordingly, it should be understood that the disclosed examples are not limiting and that the term guest may broadly represent any of various users and user-types.

Present embodiments relate to systems and methods of providing an interactive platform or interactive platform system for providing guest experiences at an amusement park (e.g., a theme park). The interactive platform may facilitate provision of tailored experiences, such as games and effects, that appeal to guests individually and allow for increased interaction between guests and park features (e.g., rides, shows, decorations, animated figures, interactive screens), other guests, costumed characters, and so forth. For example, the interactive platform may coordinate with electronic goggles, electronic eyeglasses, projection screens, or the like to provide a specialized augmented reality (AR) experience, virtual reality (VR) experience, or mixed reality (e.g., a combination of AR and VR) experience as part of an attraction, such as a thrill ride, in an amusement park. The interactive platform may also interface with more tangible entertainment features, such as animated figures, fountains, or costume components, to provide experiences based on individual preferences, characteristics, or other information about a particular guest that is available to the interactive platform.

Present embodiments may include a portal (e.g., a website or app) that allows guests to register with the interactive platform. The registration process may be utilized to obtain data about each guest that can be used within the amusement park environment to provide customized entertainment enhancements. For example, the registration process may include provision of guest access to data fields along with requests to populate the data fields with user information, such as favorite color, birthdate, height, and so forth. These data fields may then be used to control interactions, such as an augmented reality laser beam having the user's favorite color, an animated figure adjusted to appear as though looking into the user's eyes based on the user's height, or a customized dialogue that mentions the user's birthdate. The registration process may be a component of a larger process or include a sub-process for obtaining tickets, making reservations, assembling a schedule of events, or other such activities in relation to the amusement park. For example, a guest may login and register via an app stored on a mobile device (e.g., a smart phone or smart watch) to obtain tickets to enter the park and to schedule certain events (e.g., rides, restaurant reservations, park area entry, or shows). As part of this registration process, login credentials may be required. While the interactive platform may certainly provide for internal generation of new login credentials (e.g., a new user identification and password) separate from any other account, the interactive platform may also allow for coordination with a separate account and a separate system. For example, the interactive platform may allow for a login based on a separately established third-party account that already has established login credentials. In some embodiments, the user may create new login credentials and use the separately established third-party account. For example, the user may provide a user name (e.g., a themed name) for the new account but still use the login credentials from the established third-party account.

Embodiments of the interactive platform may enable direct entry of personal information into data fields when populating a database with personalized information about a user. However, this type of input may alert savvy guests to the nature of park interactions that are intended to entertain the guest partially through the surprise of personalization. For example, if a user indicates a particular preference (e.g., a user's favorite planet is Saturn) and that preference is manifested in a special effect provided for the guest (e.g., a surprise simulation of the guest traveling to Saturn) in the amusement park, it may be apparent to the guest that the source of the preference was the registration process, which may eliminate mystery from the experience. Because mystery and seemingly magical aspects of an interaction are desirable, present embodiments may limit direct input of preferences. For example, present embodiments may incorporate hidden data fields that are indirectly populated as part of a registration process or other process associated with managing a user's account. Specifically, for example, based on limited information provided by a guest, the interactive platform may obtain personalization data from a separate data source. This may include importing data from a third-party database associated with a login authentication for the interactive system. In fact, such a data importing step may be integrated with the login authentication to further obfuscate the nature of the interaction and increase the potential for surprising the guest with immersive and personal special effects in the amusement park.

In accordance with present embodiments, a centralized login protocol for the interactive platform may provide efficient authentication of users and facilitate account setup. For example, by linking to a previously established account on a separate (e.g., third-party) system, which has a familiar login identity and password, a single sign-on procedure employed by the interactive platform may allow a user to authenticate and/or create a new account on a website or app associated with the interactive platform. This may be achieved using a universal login application program interface (API) supported by the separate system and accessible to the interactive platform. As can be appreciated by anyone that has to deal with login credentials for numerous accounts, users may prefer this manner of login because it simplifies the handling of passwords and identification data by avoiding the creation of yet another set of credentials for a specific website or app. Present embodiments may facilitate this process by offering a web or app tool (e.g., a button or other type of input) via the interactive platform, wherein the web or app tool functions to allow the user to select verification via the separate system. Upon selection of this web or app tool, which may be referred to as an interface tool, a link between the separate system and the interactive platform may be established or opened such that credentials from the separate system may be used to verify authenticity of the user. For example, a window in a graphical user interface (GUI) may be opened with a prompt to enter credentials for the separate system and, upon successful authentication, the separate system may provide an indication of authentication to the interactive platform. Thus, present embodiments may open a new account and/or provide an authenticated login for a website or app of the interactive platform based on the approval of a separate or third-party system without the need for the website or app to receive or store login credentials. It should be noted that some or all of the communication between the interactive platform and the separate system may be encrypted to provide data security. Thus, each of these features may be configured to decrypt the relevant data.

In addition to providing authentication via the universal login API, present embodiments may utilize communication between the interactive platform and the separate system (e.g., third-party system) to obtain user data to populate hidden data fields in the interactive platform. Specifically, user information that can be employed to provide individualized special effects may be communicated (e.g., scraped) from the separate system using a communication protocol that is employed as part of the login process performed by the interactive platform and the separate system. While some information may be directly obtained via the website or app associated with the interactive platform, certain data fields may be hidden from the guest to facilitate provision of surprise interactions in the amusement park. For example, a user's nickname may be entered directly into the interactive platform via revealed data fields (e.g., prompted entries) while a favorite color, favorite fictional character, or other available data may be obtained from a database of the separate system and used to populate hidden fields of the interactive platform. In present embodiments, this action requires approval and may require varying levels of approval. For example, different types of data may be defined and separate permissions obtained. Data may be divided into three or more levels or tiers, such as confidential (e.g., password and social security number), fundamental (e.g., birthdate, eye color, and height), and trivial (e.g., favorite planet, favorite color, and lucky number). In accordance with an embodiment, no confidential data will ever be transferred in this manner. Further, a guest may be allowed to select other types of data (if any) that may be transferred. For example, an app or website of the interactive protocol may provide a prompt that allows for the transfer of trivial data but not fundamental data. In other embodiments, a general approval is provided for transfer and interaction with the separate system as part of allowing use of the separate system in the login process. Once permission for access is confirmed, transfer of data may then be performed in a manner that limits the visibility of the data being transferred. Thus, data obtained for these hidden data fields in this manner can be used in interactions in the amusement park to surprise and delight the guest. By concealing the origin of the data used for personalization, an immersive and magical feel may be provided and a sense of mystery generated.

FIG. 1 is a schematic representation of an interactive platform 10 including a control center 12 and interactive devices 14, wherein the interactive platform 10 is coupled to a separate system 16 for authentication and data provision services in accordance with an embodiment. The interactive platform 10 may be defined as including hardware 18 (e.g., one or more processors and memories) and software applications 20 that are used together as support for other applications, processes, device, technologies, and the like that are developed or utilized in conjunction with the interactive platform 10. In one embodiment, the interactive platform 10 includes the interactive devices 14, which may reside within an amusement park 21. In one embodiment, the interactive platform 10 may simply include the control center 12, which may include a computer and software (e.g., an operating system) that hosts websites (e.g., a registration website) and runs applications (e.g., applications that manage special effects devices) over one or more networks 22. It should be noted that the interactive platform 10 may interface with the separate system 16 (or third-party system 16) over a different network (e.g., a public network) than the network (e.g., a private and secured network) that the interactive platform 10 uses to interface with the interactive devices 14. Like the interactive platform 10, the separate system 16 may also include its own hardware 18 and software applications 20. While these components of the interactive platform 10 and the separate system 16 share reference numbers, they may be completely separate features.

To perform some of the operations described in the present disclosure, the interactive platform 10 (e.g., the control center 12) and the separate system 16 may each include certain components to facilitate these operations. With this in mind, FIG. 1 includes example components within the interactive platform 10 and the separate system 16, in accordance with embodiments described herein. It should be noted that each of the control center 12 and the separate system 16 includes its own separate components but the components are similar in nature and are, thus, identified with like reference numerals. Specifically, each of the control center 12 and the separate system 16 may respectively include a communication component 30, a processor 32, a memory 34, a storage 36, input/output (I/O) ports 38, a display 40, and the like. The communication component 30 of the control center 12 may be a wireless or wired communication component that may facilitate communication using the one or more networks 22. For example, the communication component 30 of the control center 12 may function to communicate with the separate system 16 to obtain data from a third-party database 44, communicate with a guest's computing system 46 to set up an account, or communicate with any other device accessible via the one or more networks 22. In particular, the control center 12 may communicate with the separate system 16 to utilize a universal login API 41 stored thereon.

It should be noted that the processor 32 may be any type of computer processor or microprocessor capable of executing computer-executable code. Further, the processor 32 of the control center 12 may be representative of or include multiple processors that are part of the control center 12 and that may perform processing operations herein described. The memory 34 and the storage 36 may be any suitable article of manufacture that can serve to store processor-executable code, data, or the like. These articles of manufacture may represent computer-readable media (e.g., any suitable form of memory or storage) that may store the processor-executable code used by the processor 32 to perform the presently disclosed techniques. The memory 34 and the storage 36 may also store data, results from analysis of acquired data, various software applications, and the like. It should be noted that non-transitory merely indicates that the media is tangible and not a signal.

The I/O ports 38 may be interfaces that may couple to communication features or peripheral components such as input devices (e.g., keyboard, laser scanner, mouse, microphone), sensors, input/output (I/O) modules, output devices (e.g., the interface devices 14) and the like. In an embodiment, the control center 12 may include one or more programmable logic controllers (PLCs) that include the I/O ports 38, which facilitate communicative coupling to the interactive devices 14. The one or more PLCs may be part of the control center 12 and may also couple with a central control terminal or an operator station of the control center 12 via the I/O ports 38. Such an arrangement may provide automation control functionality from the control center 12 (e.g., the operator station and the one or more PLCs) to the interactive devices 14 in accordance with present embodiments. In an embodiment, the display 40 may be part of the central control terminal. The display 40 may operate to depict visualizations associated with software or executable code being processed by the processor 32. The display 40 may be any suitable type of display, such as a liquid crystal display (LCD), plasma display, or an organic light emitting diode (OLED) display, for example. Additionally, in one embodiment, the display 40 may be provided in conjunction with a touch-sensitive mechanism (e.g., a touch screen).

It should be noted that the components described above with regard to the interactive platform 10 are exemplary components and the interactive platform 10 may include additional or fewer components relative to what is shown. Additionally, it should be noted that a guest's computing system 46 (e.g., mobile computer, mobile device, or desktop computer) that the interactive platform 10 is configured to communicate with may include components similar those described as part of the control center 12 and the separate system 16. Further still, it should be noted that aspects of the interactive platform 10 and/or separate system 16 may include or work in conjunction with a cloud-based computing system, server, or the like.

In FIG. 1, guests or other users 52 (e.g., booking agents) are depicted as communicating with the interactive platform 10 using guest computing systems 46 to setup or manage an account. One of the users 52 is communicating with the interactive platform using a mobile device 54 and the other user 52 is communicating with the interactive platform using a desktop computer 55. However, any of various different computer-based technologies may be used by the users 52 to interface with the interactive platform 52. In each case, a graphical user interface (GUI) 56 may be provided for display on the user's computing system 46 to facilitate account management. As will be discussed in further detail below, the GUI 56 may facilitate input of an account identification (ID) (e.g., a user's email address) and allow for registration via the separate system 16.

The control center 12 may include a database 62 with numerous data fields 64. Some of these data fields 64 may be forward facing data fields 66 and some are hidden data fields 68. For example, the forward facing data fields 66 may include a data field for establishing a user account (e.g., inputting a user ID, such as an email address), and the hidden data fields 68 may include data fields for user preferences. The forward facing data fields 66 may be populated directly into the control center 12 via the guest computing system 46. For example, upon connecting with the interactive platform 10, the GUI 56 may be provided to the user computing system 46 with a prompt for entering a new or existing user identification. When the user identification, such as an email address and/or facial recognition data, is provided via the GUI 56, one of the forward facing data fields 66 for storing the user identification may be populated. The hidden data fields 68, on the other hand, may be indirectly populated. Specifically, the hidden data fields 68 of the control center 12 may be populated from data fields 72 of a database 73 present in the separate system 16 that correspond to the user. For example, upon selection of authentication via the separate system 16 and approval of information sharing between the interactive platform 10 and the separate system 16, user data available in the separate system 16 may be imported or otherwise entered into the hidden data fields 68. This may be done in conjunction with the authentication process. For example, the data for the hidden data fields 68 may be provided in parallel or in series with authentication credentials. The communication of the data for the hidden data fields 68 and the authentication data may be encrypted to maintain a private interaction.

Once the hidden data fields 68 are populated with the relevant user data, the relevant user data may be used by the interactive platform 10 (e.g., a processor and algorithm of the control center 12) to identify characteristics, preferences, and so forth of a guest. Further, this personalized data (e.g., preferences and characteristics) may be utilized by the interactive platform 10 to provide effects in an amusement park that are tailored to entertain and delight individual guests. For example, the interactive platform 10 may include or communicate with a guest identification system 78. The guest identification system 78 may include a camera, a signal detector (e.g., radio-frequency identification (RFID) detector, an integral global positioning satellite (GPS) detector), or some other guest identification mechanism (e.g., a feature built into one of the interactive devices 14 configured to detect use by a particular guest). When a guest is identified at a particular location proximate one of the interactive devices 14 or as actually interfacing with a particular device of the interactive devices 14 (e.g., virtual reality goggles), the interactive platform 10 may control the interactive device 14 (or multiple such devices) based on the personalized data stored in the hidden data fields 68. For example, the interactive devices 14 may include a drone 82, virtual reality goggles 84, an animated FIG. 86, an interactive display 88, an interactive fountain 90, or the like. Further, as instructed by the interactive platform 10 (e.g., the control center 12), each of the interactive devices 14 may designed to perform a personalized action based on data from the hidden data fields 68. For example, in an embodiment, the drone 82 and fountain 90 may provide lighting effects that heavily incorporate the guest's favorite colors (e.g., the colors of the user's favorite sports team). As another example, the animated FIG. 86 may be operated to adjust a gaze based on data indicative of the guest's height. As yet another example, the virtual reality goggles 84 and/or the interactive display 88 may provide a virtual environment and virtual characters that align with a theme preference or fictional character preference of the guest.

Figure 2:
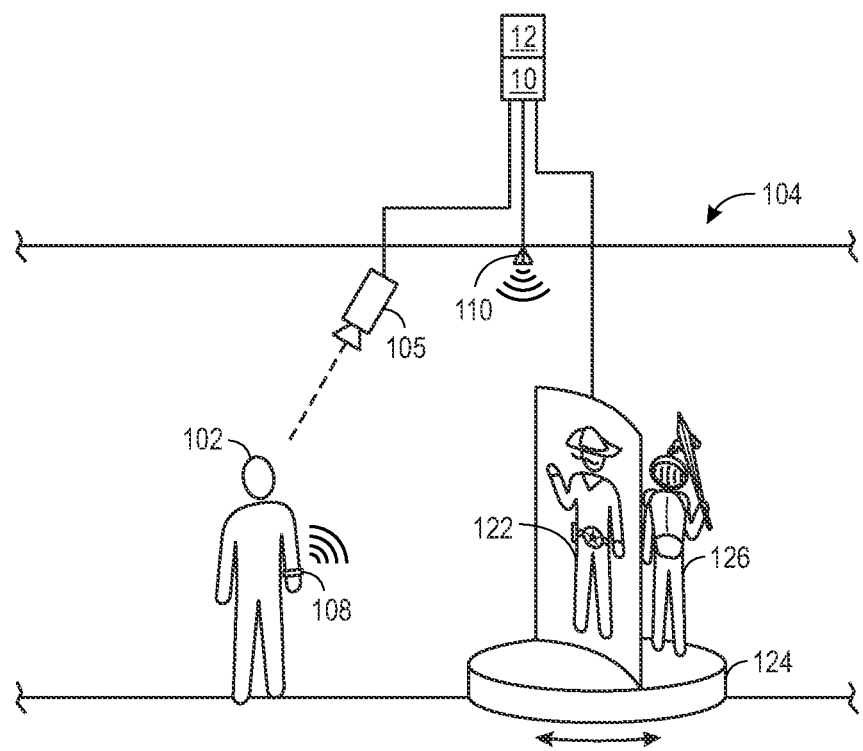
FIG. 2 is a schematic perspective view of an amusement park venue with an interactive device configured to be controlled by an interactive platform based on hidden data associated with a user detected in the venue by a user detection system, in accordance with an embodiment of the present disclosure.

FIG. 2 is a schematic perspective view of a guest 102 in an amusement park venue 104, wherein the interactive platform 10 is operating to provide a tailored special effect for the guest 102 in accordance with an embodiment of the present disclosure. In the illustrated embodiment, the interactive platform 10 has identified the guest as being present in the venue 104 using a combination of facial recognition and RFID detection. Specifically, a camera 105 operates to detect facial features of the guest 102 and those facial features are being compared with user data stored in the control center 12, such as in the forward facing data fields 66 (e.g., an image provided upon entry to the venue 104). The facial identification data stored in these forward facing fields 66 may have been provided by the guest 102 during a registration process via a camera on the guest's computing system 46. In conjunction with this, a RFID tag 108 being worn and associated with the guest 102 (e.g., associated with a guest account based on serial number of the RFID tag 108) is being detected by an RFID detector 110. The camera 105, the RFID detector 110, and/or the RFID tag 108 may be considered features of the guest identification system 78. However, in some embodiments, only one technique (e.g., facial identification or signal detection) may be used to identify the location/presence of a guest. Once the guest 102 has been identified and associated with an account (e.g., via forward facing data fields 66 and/or hidden data fields 68), data from the hidden data fields 68 may be employed to utilize preferences of the guest 102 in the provision of special effects. For example, in the illustrated embodiment, the guest 102 may have a preference for cowboy themed environments over medieval themed environments. Accordingly, as shown, an animated figure of a cowboy 122 may be positioned on a turntable 124 for viewing by the guest 102 instead of an animated figure of a medieval knight 126.

Figure 3:
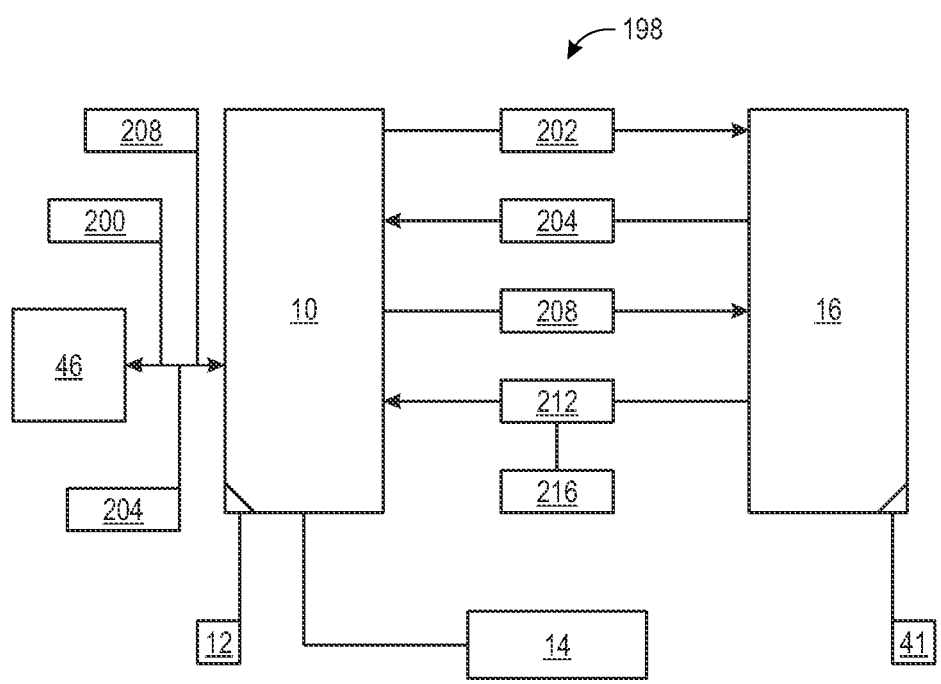
FIG. 3 is a block diagram of interactions between and interactive platform and a separate system to provide authentication of an account and interactions in an amusement park, in accordance with an embodiment of the present disclosure.

FIG. 3 is a block diagram of a process 198 of interactions between the user computing system 46, the interactive platform 10 (e.g., the control center 12), the separate system 16, and the interactive devices 14 in accordance with an embodiment of the present disclosure. In the illustrated embodiment of FIG. 3, the control center 12 initiates contact with the separate system 16 based on instructions from a user obtained via communication from the user computing system 46. For example, a user may be interfacing with the control center 12 via the user computing system 46, which is communicatively coupled to the control center 12 (e.g., via a network), by requesting access to an account via the GUI 56. Specifically, as a component of requesting access to the account via the GUI 56, the user may opt to use login credentials from the separate system 16. This may include activating a web app or tool on the GUI 56, such as a soft button, that initiates communication regarding the requested account with the separate system 16. The initial input 200 provided by the user via the GUI 56 may include an account identifier (e.g., an email address) and selection of an option to use the separate system 16 for authentication, which may include using a universal login API 41. In some embodiments, a user-entered account identifier may not be provided until the user is interfacing with the separate system 16. For example, to initiate the process, the request for a new account or access to an existing account may simply be assigned an auto-generated account number. Regardless, an initial communication 202 is provided to the separate system 16 from the control center 12 after the control center 12 processes the initial input 200, which is indicative of the user requesting a new account or access to an existing account. This initial communication 202 includes data indicating a request for coordinating user credentials from the separate system 16 (e.g., using the universal login API 41) to open or otherwise access an account for the control center 12.

In the illustrated embodiment of FIG. 3, once the initial communication 202 has been received by the separate system 16, the separate system 16 requests authentication of the user in an authentication request 204. While the authentication request 204 is illustrated as passing from the separate system 16 to the user computing system 46 via the control center 12, in other embodiments, a direct communication may be instituted or the information required for authentication may be initially prompted by the control center 12 or the GUI 56 and provided to the separate system 16 via the initial communication 202. In the illustrated embodiment, authentication data (e.g., a password) 208 is provided from the user computing system 46 back to the separate system 16 via the control center 12. This authentication data 208 may also include an authorization to provide access to other data (e.g., a user's trivial or fundamental data); however, such an authorization may also be provided in the initial communication 202. In accordance with present embodiments, as with the authentication request 204, communication of the authentication data 208 may utilize routes (e.g., a direct line of communication between the user computing system 46 and the separate system 16) other than that illustrated.

Once the separate system 16 receives and approves the authentication data 208 (via the universal login API 41), authentication approval data 212 may be provided to the control center 12 for opening or allowing access to an account associated with the authentication approval data 212. In the illustrated embodiment, hidden data 216 is also provided in conjunction with this approval data 212. The hidden data 216 may be provided as integrated with, embedded with, parallel with, in series with, or otherwise provided in relation to the approval data 212. Further, all data or a portion of the data may be encrypted. For example, the approval data 212 and/or the hidden data 216 may be encrypted. In other embodiments, the hidden data 216 is provided in a separate communication after the approval data 212. The hidden data 216 may include certain data about the user of the account associated with the authentication approval data 212, such as fundamental data (e.g., birthdate) or trivial data (e.g., favorite color). The type or nature of the hidden data 216 provided may depend on the nature of approved communications by the user (e.g., as indicated via the GUI 56). For example, a user may indicate that only trivial data can be shared between the interaction platform 10 and the separate system 16. By transmitting the hidden data 216 in this fashion, the transfer of the data is inconspicuous to the user, which facilitates later surprise of the user via the interactive devices 14.

Once the hidden data 216 and the authentication approval data 212 is provided to the control center 12, the control center 12 may open and/or access an account for the user and populate that account with the hidden data 216. Further, this hidden data 216 may be employed for special effects and the like. Specifically, the control center 12 may utilize the hidden data 216 to control the interactive devices 14. As an example, with reference back to FIG. 1, the control center 12 may control the virtual reality goggles 84 to display a virtual reality experience that corresponds to a preference of the user found in the hidden data 216. Specifically, for example, in a virtual haunted house, the control center 12 may control the virtual reality goggles to provide imagery corresponding to a werewolf instead of other options (e.g., a ghost or zombie) because the user has indicated a preference for werewolves in the horror genre. By obscuring or masking the acquisition of such a preference via the transmission of the hidden data 216 in the disclosed fashion, an element of surprise can be added to experiences in an amusement park, such as via the provision of experiences in line with user preferences or characteristics. Surprise interactions may also include providing information about the user from an interactive device 14. For example, the animated FIG. 86 dressed as a fortune teller may announce an astrological sign associated with the birthdate of the user, which may surprise and delight the user.

Figure 4:
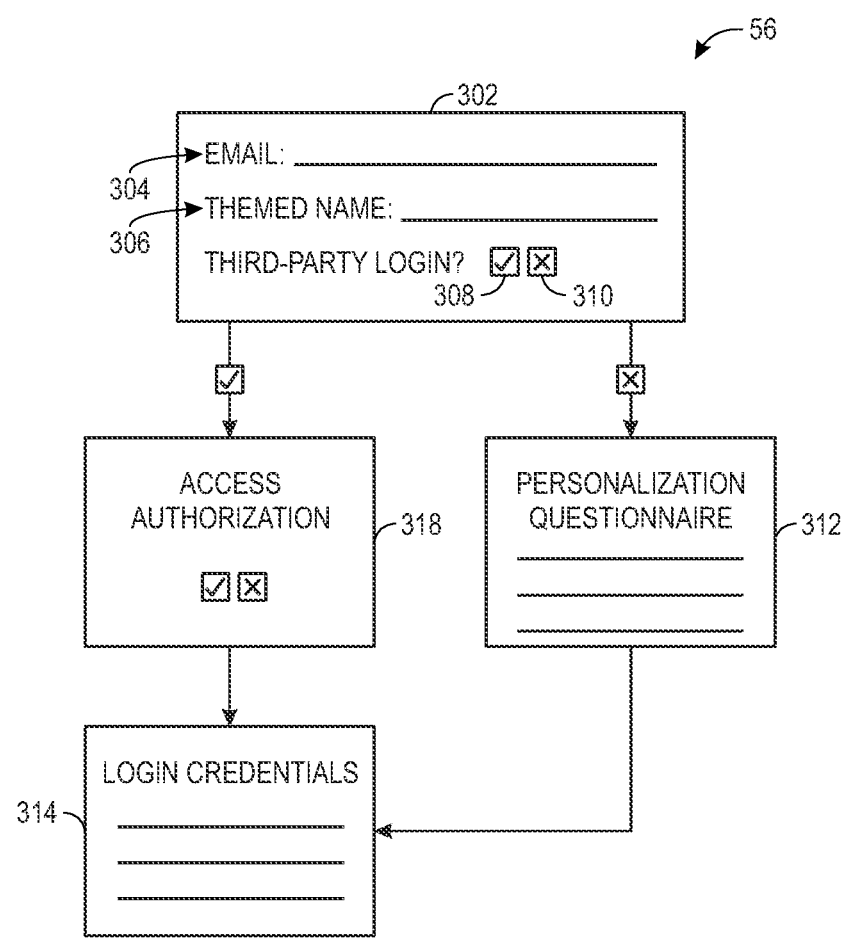
FIG. 4 is a block diagram of a graphical user interface with various transitions based on a process flow of providing authentication of an account and provision of interactions in an amusement park, in accordance with an embodiment of the present disclosure.

FIG. 4 is a schematic diagram of interactions with the GUI 56 in accordance with an embodiment of the present disclosure. A first GUI 302 may be provided via a display of the user computing system 46 in response to initiation of contact with the control center 12 to open or access a user account. The first GUI 302 includes prompts for the user to provide identification, specifically a prompt for an email address 304 and a prompt for a themed name 306 (e.g., a nickname or username). Further, the first GUI 302 provides a prompt to approve 308 or a prompt to decline 310 utilization of the separate system 16 for authentication purposes. The described prompts and other prompts may also be included to facilitate or add aspects to the disclosed interactions. The prompts may include inputs for data entry, toggle buttons, radio button, other interface tools and so forth.

If the user declines utilization of the separate system 16 for the purpose of authentication by selecting the prompt to decline 310, a personalization GUI 312 may be provided on the user computing system 46 to allow the user to enter preferences and characteristics directly. While this provides desired information about the user for use in an amusement park via the interactive devices 14, this acquisition of data is not hidden and will limit the provision of surprise. Such data may be gleaned from questions presented by the personalization GUI 312 that are intended to conceal the acquisition of relevant data. However, a savvy user may perceive the intent of the questions. In some embodiments, the user may decline to use the separate system 16 for authentication but allow data sharing between the separate system 16 and the interactive platform 10 (e.g., the control center 12). After the personalization GUI 312 is addressed, a login credential request GUI 314 may be presented on the user computer system 46 to confirm authenticity of the user and open or access a user account.

If the user accepts utilization of the separate system 16 for authentication purposes by selecting the prompt to approve 308, an access authorization GUI 318 may be provided via the user computer system 46. The access authorization GUI 318 may provide an access authorization prompt 322 that allows the user to indicate whether data beyond the data required for authorization may be shared with the interface platform 10 from the separate system 16. This may include additional prompting for types of data that can be shared, such as whether only trivial data can be shared or additional data can be shared. By allowing this data sharing, the hidden data 216 may be provided to the control center 12 for purposes of surprising the guest via interactions in the amusement park, as discussed above. If access authorization is accepted, the login credential request GUI 314 may be immediately provided via the user computer system 46. If access authorization is declined, the personalization GUI 312 may be presented and then the login credential request GUI 314 may be provided upon completion of the personalization GUI 312.

While only certain features and embodiments have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An interactive platform for controlling interactive features in an amusement park, wherein the interactive platform comprises:
   a control center comprising one or more hardware processors configured to:
   receive an account request from a user computer system;
   populate forward facing data fields based on user inputs from the user computer system;
   coordinate authentication of the account request with a separate system configured to utilize a login application programming interface to share authentication data;
   receive the authentication data from the separate system and provide access to a user account based on the authentication data; and
   populate hidden data fields of the control center based on user data provided by the separate system.

2. The interactive platform of claim 1, wherein the control center is configured to receive the authentication data and the user data in parallel from the separate system or configured to receive the user data embedded in the authentication data.

3. The interactive platform of claim 1, wherein the control center is configured to limit the user data received from the separate system based on a type of the user data, and wherein the control center is configured to block confidential portions of the user data but allow trivial portions of the user data to be received, and wherein the confidential portions and the trivial portions are defined by one or both of the control center and the separate system.

4. The interactive platform of claim 1, wherein the control center is configured to limit the user data received from the separate system based on a type of the user data, and wherein the control center is configured to employ user input to dictate the type of the user data provided by the separate system that will be accepted and/or declined by the control center.

5. The interactive platform of claim 1, wherein the control center comprises a programmable logic controller.

6. The interactive platform of claim 1, wherein the interactive features of the amusement park comprise virtual reality glasses, augmented reality glasses, a display screen, an animated figure, a ride vehicle, or a combination thereof, of an amusement park attraction.

7. The interactive platform of claim 6, comprising a guest identification system that is communicatively coupled to the control center, wherein the guest identification system is configured to detect a guest in the amusement park attraction and communicate an indication of a presence of the guest to the control center.

8. The interactive platform of claim 7, wherein the control center is configured to associate the presence of the guest with the populated hidden data fields of the control center and control the interactive features of the amusement park attraction based on the populated hidden data fields of the control center while the guest is present in the amusement park attraction.

9. The interactive platform of claim 1, wherein the control center is configured to receive the authentication data and the user data as encrypted data.

10. The interactive platform of claim 1, wherein data contained within the populated hidden data fields is not selected or entered by a user of the interactive platform with the interactive platform.

11. The interactive platform of claim 1, wherein the populated hidden data fields indicate a favorite color of a user, a birthday of the user, a favorite fictional character of the user, an astrological sign of the user, a lucky number of the user, a favorite sports team of the user, or a combination thereof.

12. The interactive platform of claim 1, wherein the populated hidden data fields indicate a height of a user, the interactive features comprise a display of an amusement park attraction, and the control center is configured to:
    adjust a height of an animated character presented on the display of the amusement park attraction to correspond to the height of the user indicated in the populated hidden data fields.

13. The interactive platform of claim 1, wherein the interactive features comprise a ride vehicle of an amusement park ride that is controlled based, at least in part, on the populated hidden data fields of the control center.

14. A method of authentication and population of hidden data fields to facilitate control of interactive devices in an amusement park setting, the method comprising:
    receiving an account request at a control center from a user computer system;
    populating forward facing data fields of the control center based on user inputs from the user computer system;
    coordinating, by the control center, authentication of the account request with a separate system configured to utilize a login application programming interface to share authentication data;
    receiving, at the control center, the authentication data from the separate system and providing access to a user account for the user computer system based on the authentication data; and
    populating hidden data fields of the control center based on user data provided by the separate system.

15. The method of claim 14, comprising receiving and decrypting, at the control center, the user data provided by the separate system.

16. The method of claim 14, comprising:
    providing a graphical user interface to the user computer system from the control center to acquire the user inputs for populating the forward facing data fields; and
    requesting, via the graphical user interface, an authorization to share at least one type of data between the control center and the separate system.

17. The method of claim 14, wherein the data in the at least one of the hidden data fields includes a user preference, user characteristic, or a combination thereof.

18. A system for populating hidden data fields and controlling interactive experiences in an amusement park based on the hidden data fields, the system comprising:
    a control center comprising one or more hardware processors;
    a separate system communicatively coupled to the control center and configured to utilize a login application programming interface to share authentication data with the control center, wherein the control center is configured to:
        receive an account request from a user computer system and populate forward facing data fields based on user inputs from the user computer system,
        coordinate authentication of the account request with the separate system based on interfacing with the login application programming interface,
        receive the authentication data from the separate system and provide access to a user account based on the authentication data, and
        populate the hidden data fields of the control center based on user data provided by the separate system; and
    one or more interactive devices positioned in the amusement park, communicatively coupled to the control center, and configured to be controlled by the control center based on the user data.

19. The system of claim 18, comprising a user identification system positioned within an amusement park attraction of the amusement park and configured to activate the control center to control the one or more interactive devices based on the populated hidden data fields in response to determining that a user associated with the user data is present within the amusement park attraction.

20. The system of claim 18, wherein the one or more interactive devices comprise one or more interactive devices of an amusement park attraction communicatively coupled to the control center, and wherein the control center is configured to control the one or more interactive devices of the amusement park attraction based at least in part on the populated hidden data fields of the control center.

* * * * *